US005260878A

United States Patent [19]

Luppy

[11] Patent Number: 5,260,878

[45] Date of Patent: Nov. 9, 1993

[54] WEB PRESS MONITORING SYSTEM

[75] Inventor: Richard A. Luppy, Allston, Mass.

[73] Assignee: Automation, Inc., Needham, Mass.

[21] Appl. No.: 756,054

[22] Filed: Sep. 6, 1991

[51] Int. Cl.[5] G06F 15/46

[52] U.S. Cl. 364/474.16; 364/469; 364/551.01

[58] Field of Search 364/469, 551, 550, 498, 364/468, 471, 518, 523, 474.16, 551.01, 401, 402

[56] References Cited

U.S. PATENT DOCUMENTS

| | | | |
|---|---|---|---|
| 4,335,435 | 6/1982 | Miura | 364/469 |
| 4,346,446 | 8/1982 | Erbstein et al. | 364/469 |
| 4,361,260 | 11/1982 | Hanlan | 364/469 |
| 4,366,542 | 12/1982 | Anselrode | 364/469 |
| 4,391,079 | 7/1983 | Cherney | 364/469 |
| 4,463,430 | 7/1984 | Volk, Jr. et al. | 364/469 |
| 4,495,582 | 1/1985 | Dessert et al. | 364/469 |
| 4,495,583 | 1/1985 | Punater | 364/469 |

*Primary Examiner*—Jack B. Harvey
*Assistant Examiner*—Thomas Peeso
*Attorney, Agent, or Firm*—Wolf, Greenfield & Sacks

[57] ABSTRACT

A computerized monitoring system is used for monitoring the operation of web presses. The computerized monitoring system includes a recorder for automatically recording log entries for each of the respective web presses. The log entries specify the occurrence of particular events and also specify the time at which such events occurred. The computerized monitoring system additionally includes a processor that generates a daily press record for at least one of the web presses. The daily press record summarizes activity of a press for a time frame including the waste, gross and net production. Lastly, the computerized monitoring system is provided with a user interface such as a video display or press for displaying the daily press record. The computerized monitoring system has the capability of operating in real time.

18 Claims, 18 Drawing Sheets

Fig.3

| | DATE 26 | TIME 28 | SPEED 30 | REPORT 32 | GROSS 34 | CODE 36 | WASTE 38 | FORM 40 | INDEX 42 |
|---|---|---|---|---|---|---|---|---|---|
| 27 | 10/06 | 08:04 | 0 | COUNT COMPLETE | 0 | | 0 | 0 | 1000 |
| 27 | 10/06 | 08:04 | 0 | FORM COMPLETE | 0 | 2000 | 0 | 0 | 2000 |
| 27 | 10/06 | 09:31 | 0 | FORM STARTED | 0 | | 0 | 1 | 3000 |
| 27 | 10/06 | 10:07 | 0 | MAKE READY I OVER | 190 | 010 | 0 | 0 | 4000 |
| 27 | 10/06 | 10:08 | 7,200 | PRESS RESTART | 230 | 060 | 0 | 0 | 5000 |

PRESS LOG

Fig.4

DAILY PRESS RECORD

| ROW 44 | START 46 | END 48 | ELAP. 50 | CODE 52 | DESCRIPTION 54 | GROSS 56 | WASTE 58 | JOB # 60 |
|---|---|---|---|---|---|---|---|---|
| 1.0 | 07:30 | 07:30 | 0 | 1100 | START OF SHIFT | 0 | 0 | |
| 2.0 | 07:30 | 07:41 | 11 | 1000 | MAKEREADY I | 0 | 0 | 95009 |
| 3.0 | 07:41 | 07:51 | 10 | 2000 | MAKEREADY II | 2768 | 2453 | 95009 |
| 4.0 | 07:51 | 07:58 | 7 | 0007 | CHANGE OR SET ROLLER | 2916 | 1992 | 95009 |
| 5.0 | 07:58 | 08:13 | 15 | 2000 | MAKEREADY II | 5128 | -2 | 95009 |
| 6.0 | 08:13 | 08:21 | 8 | 0018 | PLATE PROBLEM PRESS | 5128 | 682 | 95009 |
| 7.0 | 08:21 | 08:22 | 1 | 2000 | MAKEREADY II | 5128 | 0 | 95009 |
| 8.0 | 08:22 | 08:31 | 9 | 3000 | RUNNING | 11476 | 870 | 95009 |
| 9.0 | 08:31 | 08:47 | 16 | 0104 | INK PROBLEM | 12712 | 1290 | 95009 |
| 10.0 | 08:47 | 09:03 | 16 | 3000 | RUNNING | 20432 | 251 | 95009 |
| 11.0 | 09:03 | 09:14 | 11 | 0018 | PLATE PROBLEM PRESS | 20660 | 400 | 95009 |
| 12.0 | 09:14 | 11:05 | 111 | 3000 | RUNNING | 72868 | 1372 | 95009 |
| 13.0 | 11:05 | 11:16 | 11 | 0006 | FOLDER-SHEETER ID | 72948 | 225 | 95009 |
| 14.0 | 11:16 | 12:23 | 67 | 3000 | RUNNING | 106276 | 2776 | 95009 |
| 15.0 | 12:23 | 12:35 | 12 | 0018 | PLATE PROBLEM PRESS | 106412 | 458 | 95009 |
| 16.0 | 12:35 | 12:37 | 2 | 3000 | RUNNING | 108948 | 408 | 95009 |
| 17.0 | 12:37 | 13:04 | 27 | 0116 | FAULTY WEB DETECTOR | 109208 | 993 | 95009 |
| 18.0 | 13:04 | 13:09 | 5 | 3000 | RUNNING | 112896 | 26 | 95009 |
| 19.0 | 13:09 | 13:54 | 45 | 0007 | CHANGE OR SET ROLLER | 114132 | 1926 | 95009 |
| 20.0 | 13:54 | 14:00 | 6 | 3000 | RUNNING | 117904 | 14 | 95009 |
| 21.0 | 14:00 | 14:35 | 35 | 0011 | WATER SYSTEM | 118604 | 980 | 95009 |
| 22.0 | 14:35 | 14:47 | 12 | 3000 | RUNNING | 124820 | 933 | 95009 |
| 23.0 | 14:47 | 15:30 | 43 | 0000 | WASH-UP NON CHARGE | 124820 | 4 | 95009 |
| 24.0 | 15:30 | 15:30 | 0 | 2200 | END OF SHIFT | 0 | 0 | |

WEB PRESS MONITORING SYSTEM

FIELD OF THE INVENTION

The present invention relates generally to industrial monitoring systems and, more particularly, to industrial monitoring systems for web presses.

DESCRIPTION OF THE PRIOR ART

Conventional manual and automatic monitoring approaches have proven to be less than satisfactory. When manual monitoring is employed, a press operator manually records operation information about the press he is operating. Manual monitoring has proven to be both time consuming and error prone. Automated monitoring approaches are less time consuming and less error prone but currently have only limited reporting capabilities. Therefore, the automated approaches have generally been supplemented with manual approaches.

It is, therefore, an object of the present invention to provide a computerized monitoring system for monitoring web presses which is automated to provide substantial reporting capabilities.

It is a further object of the present invention to provide a computerized monitoring system that is efficient and suffers few errors.

SUMMARY OF THE INVENTION

The foregoing objects are realized in a computerized monitoring system that monitors web presses. The computerized monitoring system includes a recorder for automatically recording log entries from each web press. Each log entry specifies an event and a time that the event occurred. In addition, the computerized monitoring system includes a means such as a processor for receiving and processing the log entries to generate a daily press record for at least one of the web presses. Preferably, a daily press record may be generated for each of the web presses. This daily press record summarizes activity of a press over a given time frame. The summary provided by the daily press record includes data concerning gross production and waste. Lastly, the computerized monitoring system includes a user interface means such as a printer or video display for displaying the daily press record to a user of the system.

It is preferred that the computerized monitoring system have the capability of receiving and processing the log entries in real time. This capability provides a press operator with the ability to monitor activity of the web presses on an ongoing basis. It is also preferred that the means for receiving and processing log entries generate the daily press record so that it identifies workers that were operating the machine. This means for receiving and processing log entries and the user interface means may be part of a general purpose data processing system. Furthermore, as will be discussed in more detail below, the means for automatically recording log entries may comprise production monitors that are coupled to such a general purpose data processing system.

The daily press record is developed iteratively in a series of steps. The means for receiving and processing log entries receives a number of different types of information from the production monitors or other means that forward information concerning the web press. Specifically, it is preferred that a log report (specifying events that occurred and when such events occurred) be forwarded to the means for receiving the processing data along with a shift report. The shift report includes information regarding a current shift of production for the web press. Lastly, a form report is sent to a means for receiving and processing log entries. The log report, shift report and form report are processed by a data processing system to generate the daily press record. The resulting daily press record may be accessible either as a hard copy or as a video copy.

BRIEF DESCRIPTION OF THE DRAWINGS

FIG. 3 is an example of a portion of a press log table.

FIG. 4 is an example of a portion of a daily press record table.

DETAILED DESCRIPTION OF A PREFERRED EMBODIMENT

Figure 1:
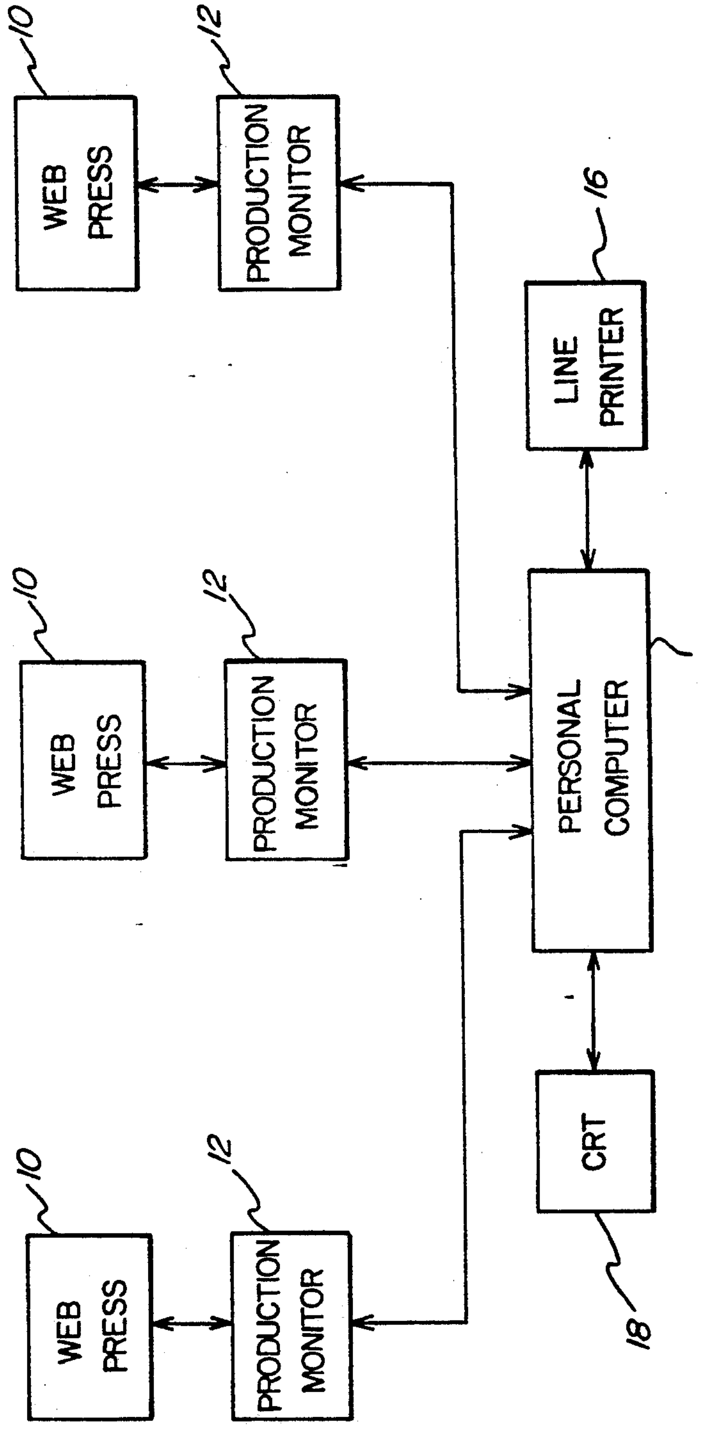
FIG. 1 is a block diagram depicting the components of a web press monitoring system of the present invention.
Figure 2:
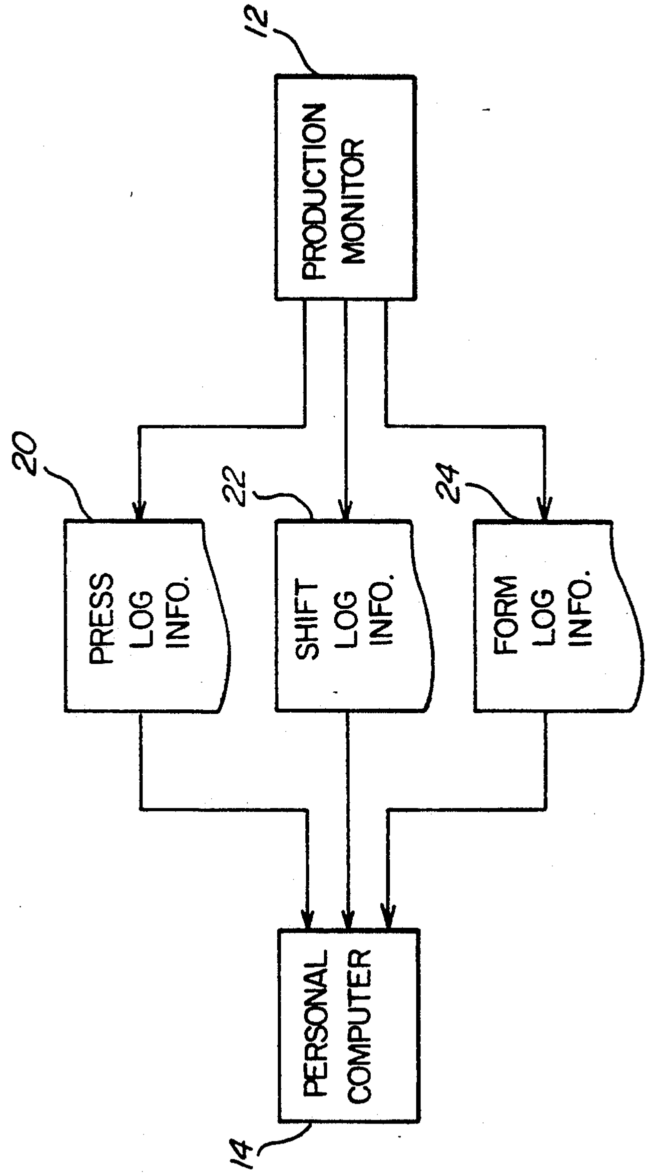
FIG. 2 is a block diagram depicting transfer of information from the production monitor to the personal computer in the web press monitor of FIG. 1.

In accordance with a preferred embodiment of the present invention, a system is provided for monitoring the activity of web printing presses. FIG. 1 depicts a typical configuration of this system. The system is coupled to several web presses 10 which are concurrently monitored by the system. Only three web presses 10 are shown in FIG. 1, but it should be appreciated that the system of the present invention may be used to monitor greater or fewer web presses. Each web press 10 is interfaced with a production monitor 12 which serves to gather data concerning the operation of the web press 10. A suitable production monitor is the "AUTO-COUNT" production monitor sold by Automation, Inc. of Needham, Mass.

Data gathered by each of the respective production monitors 12 is passed to a personal computer 14 or other suitable data processing system. The personal computer 14 includes a number of software routines designed for storing and processing the data from the production monitors. The data is then processed by the personal computer to generate reports to assist in the efficient management of the web presses 10. One especially appealing aspect of the software in the personal computer 14 is that it may generate a daily press record for each of the web presses 10. A daily press record, as will be described in more detail below, provides information regarding the daily activity of a given web press 10. A line printer 16 and/or a display device such as a CRT 18 may be coupled to the personal computer 14. Other peripheral devices may also be connected to the personal computer 14.

As was mentioned above, each production monitor gathers data concerning its corresponding web press 10 and forwards this data to the personal computer 14. The data from the production monitor is used to generate three production monitor reports. Specifically, each production monitor 12 sends press log information 20 to the personal computer 14. The press log information provides a log of events and the time that the events occurred. The press log information provides a time-based account of activity by the web presses. These log entries are generally automatically generated and recorded by the production monitor 12 with the exception of several special entries which will be described in more detail below. Also sent to the personal computer 14 is shift log information 22. The shift log information 22 provides a summary of activity on the web press 10 during a given production shift. This report provides a convenient means for reviewing the activity during the last shift of production. Lastly, each production monitor 12 sends form log information 24 to the personal computer 14. The form log information 24 summarizes the activity by the web press on a particular form (i.e., a particular printing layout). Like the press log information. both the shift log information and the form log information are automatically generated and recorded by the production monitors.

As mentioned above, a number of entries are special entries that are not automatically generated and recorded by the production monitors. These special entries are manually entered by an operator using a production monitor. These entries include annotation entries which are those entries that can be entered by a press operator to provide an annotated message with the press log information. These entries need not follow a fixed format, but rather provide a mechanism for adding a notation along with the press log entries. Other special types of entries include entries that are made when the press is down (i.e., not running). Typically, a down time entry is a four digit code known as an opcode which explains the cause for the press being stopped. Such an entry is useful in explaining why the press is halted and why production is at a specific level for a shift.

The press log, shift log, and form log information are all used by the personal computer 14 to compile separate reports (i.e., a press log report, a form log report and a shift report). Of particular interest to the present invention is the press log report. A more detailed view of a press log report is shown in FIG. 3. The press log report is formed as a table having a number of rows 27. Each row is made of a set of distinct fields that specify information about a particular event. The entries of a row include a date field 26 that specifies the date in which the entry is made. Similarly, a time field 28 is provided within each row to indicate the time at which the entry is being made. In addition, a speed field 30 is provided in each row to indicate the speed of operation of the web press at the time of the associated event. Each row is also provided with a report field 32 that provides a means for recording a description of an event.

The remaining fields in each row 27 provide information concerning the actual production activity of the web press. In particular, the gross field 34 stores the gross production at the time the event is recorded, whereas the code field 36 records an operation code (opcode) that encodes the cause of the event. The waste field 38 stores a value indicative of the current amount of paper waste from the web press. Additionally, a form field 40 is provided to store an encoded value indicating the form being run. Lastly, an index field 42 is provided to help index the row entries.

The significance of these fields can perhaps best be understood by examining a particular example. Hence, consider the third row of the press log table. The date field 26 has a value of "10/06" which indicates that the entry is for the 6th day of October. The time field 28 indicates that the time the event occurred was 9:31. From the speed field 30, it is evident that the web press was not yet operating when the event occurred. The zero value for the speed entry 30 is consistent with the description contained within the report field 32. The report field 32 indicates that the event was a new form being started. Since no production had yet been run as of the time of this entry, the gross field 34 and the waste field 38 both have a zero value. The form field 40 encodes the form to be started, which is given an encoded value of "1". Finally, the index field 42 value of "3000" indicates that this is the third entry in the press log table.

The press log report 20, the shift log report 22 and the form log report 24 are all used by the software in the personal computer 14 to generate a daily press record. The press log report 20 is especially relied on by the software and, thus, has been described in more detail than the other reports. The generation of the daily press record prevents an operator of the web press from having to complete a daily press record form manually. The manual completion of the daily press record has proven to be time-consuming and difficult. Furthermore, the necessity of manually completing the daily press record has forced operators of the web presses to focus on the generation of the daily press record rather than focussing on operation of the web press.

FIG. 4 shows an illustrative daily press record. This daily press record is generated by software within the personal computer 14, which will be described in more detail below. The daily press record, like the press log report, is organized as a table having a number of fields for each row entry. The first such entry is the row field 44 which specifies the row number of the entry in the daily press record table. The row entry 44 is followed by a start entry 46 and an end entry 48. These fields hold values indicating the start time and the end time, respectively, of the time frame captured by the row entry. The elapsed time between the start field entry and the end field entry is encoded in the elapsed time field 50. For the second entry in the daily press record of FIG. 4, the start field 46 has a value of 7:30 and the end field 48 has a value of 7:40, and, therefore, the elapsed time field 50 holds a value of "11".

These fields are followed by a code field 52 which encodes the type of activity performed by the web press during the elapsed time frame. The description field 54, which follows the code field 52, provides a narrative description of the code of the code field 52. The gross production and waste during the time frame described by the row entry are captured in the gross field 56 and waste field 58, respectively. Lastly, a job number field 60 is provided to indicate the job number being run during the elapsed time frame.

From the above description, it is apparent that the daily press record provides a convenient and powerful means for displaying production information to an operator of a web press. Specifically, it summarizes the activity that occurs during the entire duration of a given time frame such as a shift of production. A person reviewing the daily press record can determine what activities occurred during the time frame and where problems arose. It enables a reviewer of the daily press record to specifically identify the causes for waste and causes for low production during time frame of the record.

The software within the personal computer 14 that is used to produce the daily press record is comprised of a number of distinct routines. The majority of these routines act incrementally on the incoming information such as the press log information to iteratively generate the daily press record. The daily press record may be generated in one of three fashions. First, it may be generated by the user requesting the generation of the report. Specifically, the software provides a menu wherein the user may select the option of generating a particular report. This mode of operation is referred to as the "manual" mode. Second, the report may be generated in an "automatic" mode. In this mode, the daily press record is automatically generated by software at the end of each shift for each press. Third, the daily press record may be generated in a "real-time" mode. When operating in this mode, the personal computer 14 updates the daily press record every time that a new press log entry is forwarded to the personal computer. The daily press record is generated for the period of time going back to the previous shift change and continuing up to the most recent press log entry.

Figure 5:
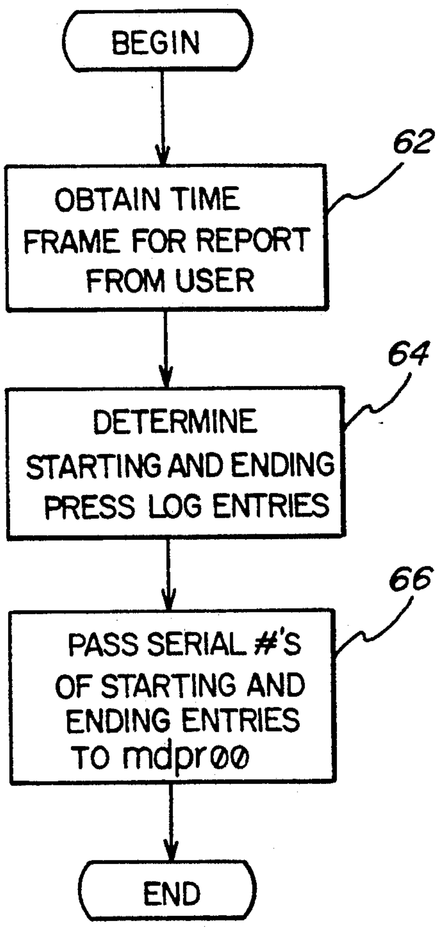
FIG. 5 depicts a flow chart of the basic steps performed by the "dpr_report" routine.

The initial routine invoked to generate a daily press record is the "dpr_report" routine. FIG. 5 provides a flow chart of the basic steps performed by this routine. Initially, the "dpr_report" routine interrogates the user to obtain information regarding the time frame for which a report is to be generated (step 62). Using the time frame information that is obtained from the user, the "dpr_report" routine determines the starting and ending press log entries for the selected time frame (step 64). Once the starting and ending press log entries have been determined, the serial numbers for these entries are passed to the "mdpr00" routine (step 66).

The "mdpr00" routine is the main routine for generating the daily press record from raw data that is held in the press log data base table and the form data base table. These data base tables hold the press log and form log entries described above. The "mdpr00" routine does most of its processing by calling a sequence of other routines (i.e., the functions beginning with the "mdpr" prefix which will be described below). This routine processes information from one press for one shift each time it is called; hence, it must be run successively by the "dpr_report" routine if more than one daily press record is to be generated. The "mdpr00" routine is passed a number of parameters that define the specifics of the daily press record to be generated. Each of the routines that it calls does further processing and refinement of the daily press record by applying certain rules and logic.

Figure 6:
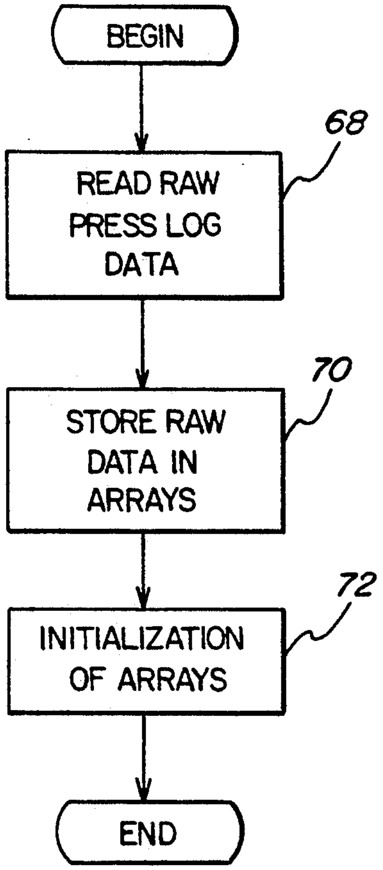
FIG. 6 depicts a flow chart of the steps performed by the "mdpr10" routine.

The functions called by the "mdpr00" routine include the "mdpr10" function. The steps performed by "mdpr10" are depicted in FIG. 6. Initially, this function reads the raw press log data from the press log data base table (step 68) and stores the data in memory arrays (step 70). In addition, this function performs some basic initialization of other arrays (step 72).

Figure 7:
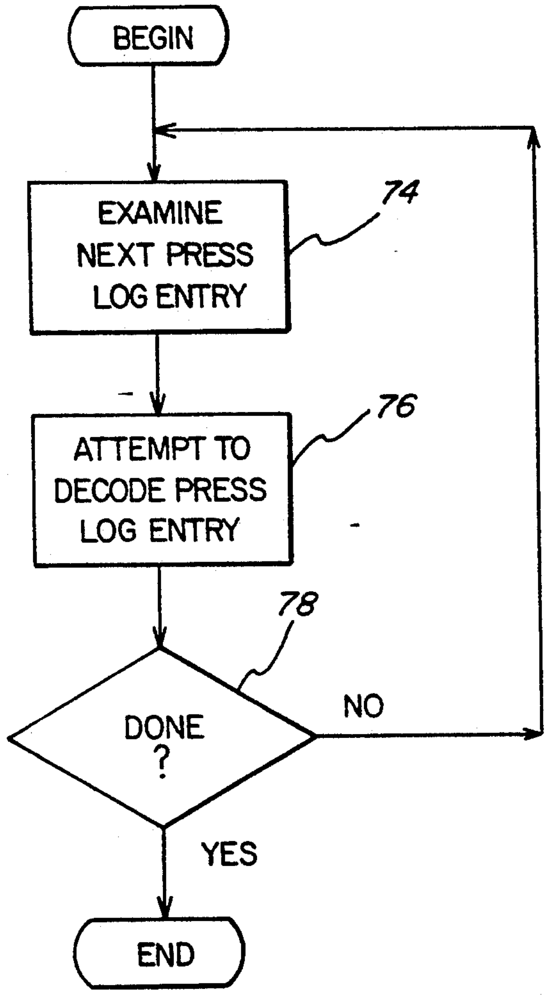
FIG. 7 depicts a flow chart of the steps performed by the "mdpr20" function.

A second function invoked by the "mdpr00" routine is the "mdpr20" function. The "mdpr20" function scans through the array holding the press log entries and examines each successive log entry in the array (step 74 in FIG. 7) until it is done (step 78). For any annotation entries, this function determines if there is a valid opcode and/or time duration specified within the annotation entry. For such annotation entries, a user may put in just a specification of an operation code (opcode) or the opcode with a duration expressed in hours. Alternatively, the user may specify the opcode plus the duration expressed in minutes. The "mdpr20" function determines whether the operation code and the duration have been expressed in a proper format. If the entries are not properly entered, this function will not be able to successfully parse the entries. Further, the software enables an operator to enter the duration minutes of a stretch of down time. Such down time entries are also processed by this routine. In particular, the entries are decoded to determine if they include a valid opcode or time duration (step 76).

Figure 8:
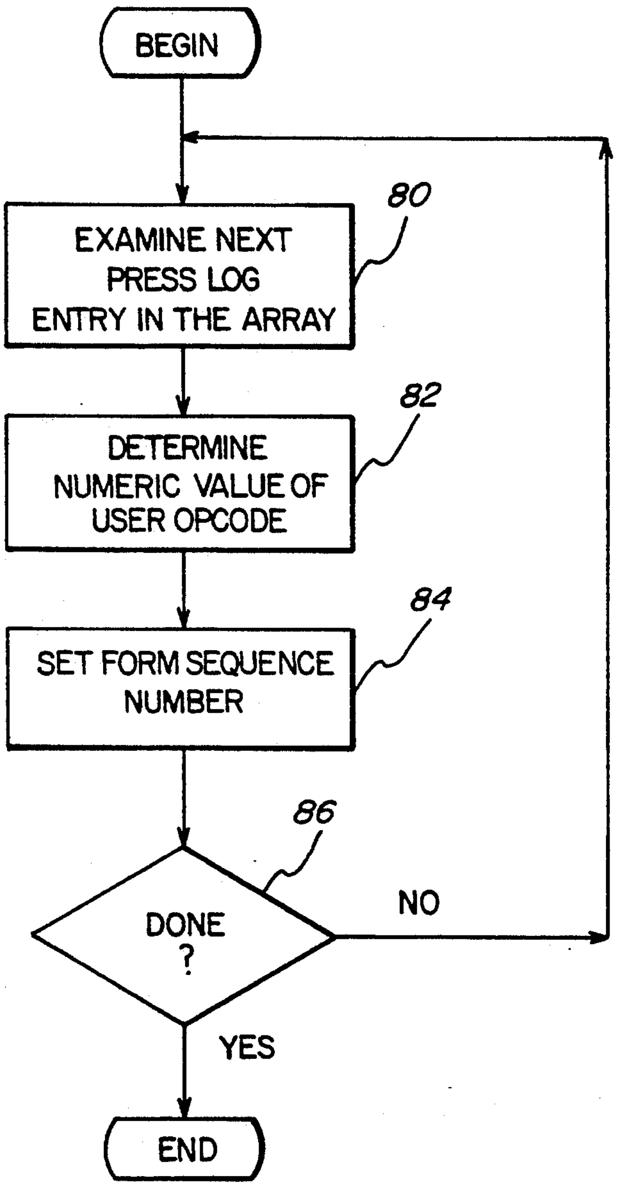
FIG. 8 depicts a flow chart of the steps performed by the "mdpr22" function.
Figure 9:
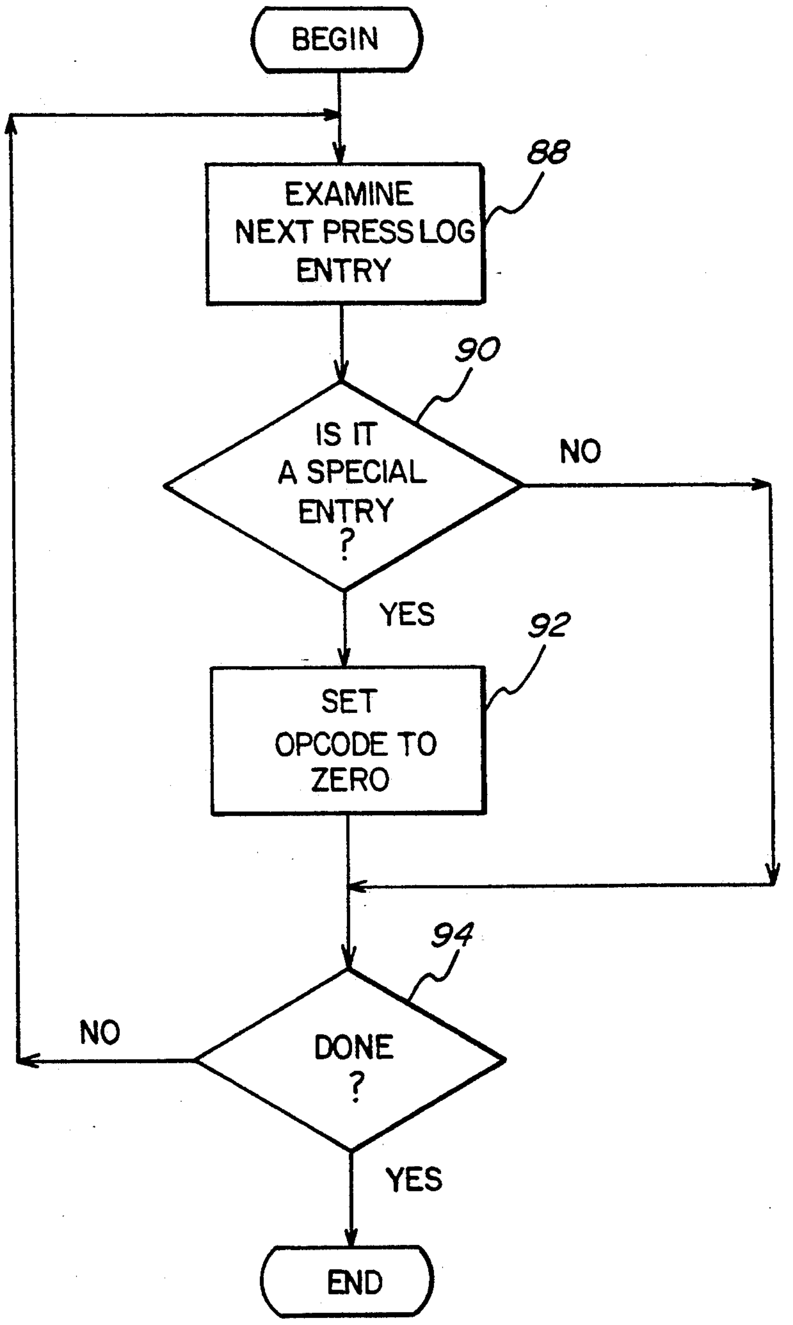
FIG. 9 depicts a flow chart of the steps performed by the "mdpr70" function.

The "mdpr00" routine also calls the "mdpr22" function. A flow chart for this function is provided in FIG. 8. The "mdpr22" routine examines successive press log entries in the array (step 80) until it is done (see step 86). For each press log entry that is examined, the routine determines a numeric value of the user opcode from the string value held in the code field 36 (see FIG. 3) of the press log table entry. In addition, this function sets the form sequence number for all press log entries (step 84). The press log entries only include a form number in the form field 40 (see FIG. 3) if the entry is a "START FORM" entry. The "mdpr70" routine does some preliminary manipulation of the press log entries prior to the actual building of the daily press record table. One of the functions of this routine is to examine successive press log entries (FIG. 9, step 88) to locate special press log entries that are used by an operator to indicate special processing. The "mdpr70" routine examines each of the press log entries and determines whether it is a special entry (step 90). If an entry is a special entry, the function logically deletes the row for that entry so that it is not processed as a regular press log entry. In order to logically delete the row, this routine sets the opcode for the entry to a value of zero (step 92). As such, this press log row is ignored in regular processing. Nevertheless, the numeric opcode for the entry is still left intact. This numeric opcode is used by other special processing routines. The "mdrp70" function continues to examine successive press log entries until it is done (step 94).

The "mdpr30" function performs the first pass at building the daily press record table from the press log entries. The daily press record is created as a series of arrays stored within memory. This routine is actually called twice during the construction of the daily press record table. On the first call, the daily press record table is built for a first time and on the second call, the original first built daily press record table is discarded and a new table is built. Between the two calls to this routine, other routines perform changes to the press log data so that the data incorporated into the second built daily press record is of more appropriate format than the previously used data. The first table is necessary so that the routines have a preliminary table to utilize.

The key to the processing and building of the daily press record is the transition table. The transition table is a look up table that is held in memory. It contains information telling the software how to process each successive press log entry to generate daily press record information. The primary goal of this routine is to convert the press log data into daily press record data blocks. For each press log entry, the transition table is used as a look up table to determine if this entry should be the boundary between the end of one daily press record block and the start of a next daily press record block. In form, the transition table is organized like a large case statement wherein the opcode and the last event that occurred are indexes that specify the case.

Figure 10:
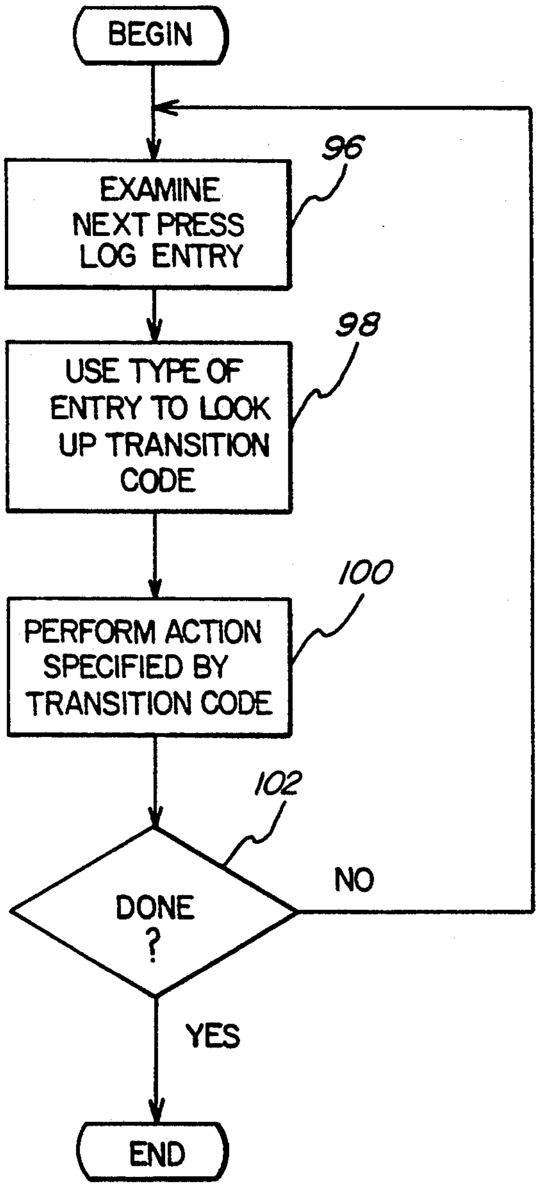
FIG. 10 depicts a flow chart of the steps performed by the "mdpr30" function.

The operations performed by this routine are summarized in the flow chart of FIG. 10. In particular, this routine examines each press log entry (step 96) and passes the type of entry along with the type of daily press record block that currently exists to the transition table. This information is used as a look up index to obtain an entry within the transition table (step 98). The entry within the transition table is a transition code. The transition code specifies which action is to be performed next. The routine then performs the action specified by the transition code (step 100). For example, the transition code may specify that the routine do nothing, start a new daily press record block with the same type of daily press record block or start a new daily press record block with a different type of block. In other words, the action that is taken by the routine is specified by the transition code.

Figure 11:
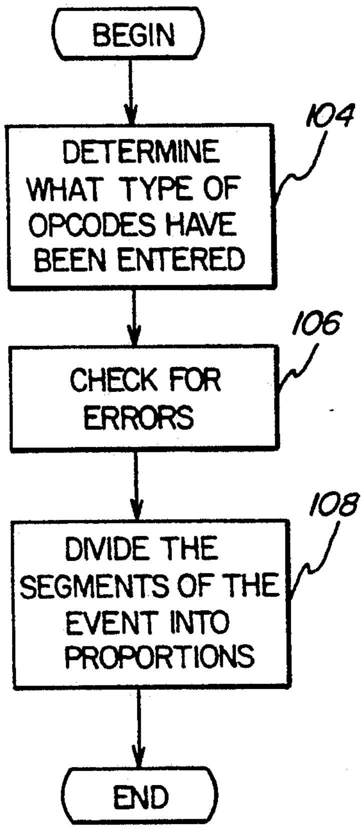
FIG. 11 depicts a flow chart of the steps performed by the "mdpr36" routine.

The "mdpr36" routine is one of the functions that is called between the first effort at building the daily press record table and the second effort at building the table. This function performs the deciphering of opcodes that are entered as down time entries. The "mdpr36" function looks at a daily press record event and determines what type of opcodes have been entered as down time entries during the event (step 104 in FIG. 11). The routine then checks for errors (step 106), and divides the segments of the event into proper proportions (step 108). As to dividing the segments of the event into proportions, this function employs a number of rules. First, if there is just one opcode for a down time event, the function assumes that the entire down time should be assigned to that opcode. In contrast, if there are multiple opcodes for the down time, the function employs rules to determine how the segment should be divided into portions. In general, the function evenly divides the time among all of the opcodes when two or more opcodes are used in one down time event.

As mentioned above, the user has the ability to enter opcodes in the press log that are appended in real time rather than inserted into the press log. When multiple opcodes occur in a single event, and one or more of the opcodes is appended in real time, the block in the daily press record is considered to have begun at the time when the press log entry was made. An exception to this rule is that when a single opcode exists for a down time event, the opcode is treated as being retroactive to the start of the down time event.

The user may also specify a duration when an opcode is entered. In this fashion, the user may state how much time was spent on a particular opcode. The logic for this operation is performed by the "mdpr20" function which will be described below.

Figure 12:
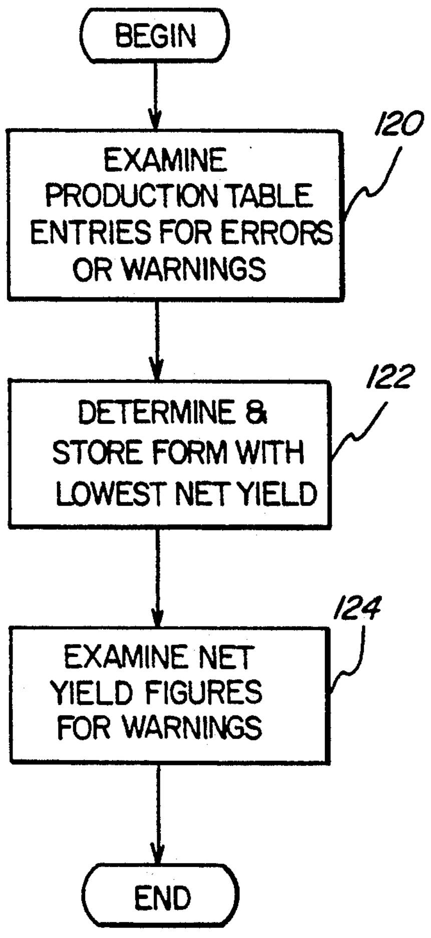
FIG. 12 depicts a flow chart of the steps performed by the "mdpr24" function.

The data read from memory by the "mdpr24" function from the last form table (i.e., the data of the last form log report) and the current form table (i.e., a table of current form log entries) are used to generate a production table. The "mdpr26" function serves primarily to process data within the production table. More specifically, this function examines the production table entries for errors and warning situations that should be brought to the user's attention (step 120 in FIG. 12). In addition, this function determines which form has the lowest yield (i.e., the lowest value when the waste is subtracted from the gross production for each form) and stores the index value of the lowest yielding form (step 122). The "mdpr26" routine also examines the net yield figures for each form to locate warning signs (step 124).

The "mdpr28" function operates in a straightforward fashion. When this function is called, the form data index array variables have values only for the "FORM STARTED" and "SHIFT CHANGE" log entries. This function fills in the values for all other press log entries.

Figure 13:
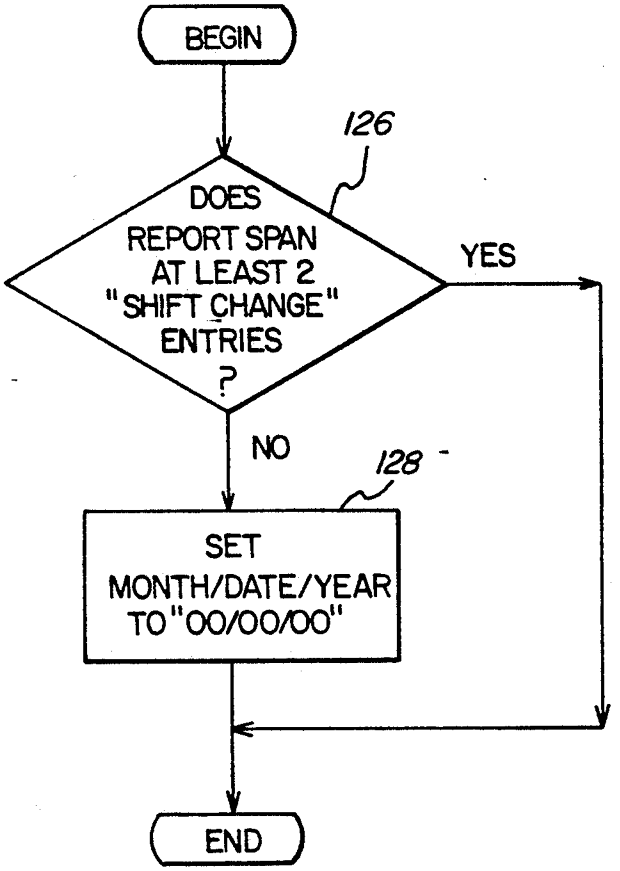
FIG. 13 depicts a flow chart of the steps performed by the "mdpr44" routine.

The "mdpr44" routine serves solely to check that the report span at least two "SHIFT CHANGE" press log entries. If not, there is an error with the way the start and end of the shift is determined. A flow chart for the steps performed by this routine is provided in FIG. 13. In particular, this routine checks to see whether the report spans at least two "SHIFT CHANGE" entries (step 126). If it does not, there is an error, and, therefore, the routine sets the month/date/year of the title of the report to "00/00/00" (step 128). If the report does span at least two "SHIFT CHANGE" entries, there is no error. Further, when the system is operating in real time mode, there is no need to check for the number of "SHIFT CHANGE" log entries. Hence, this routine is not invoked.

Figure 14:
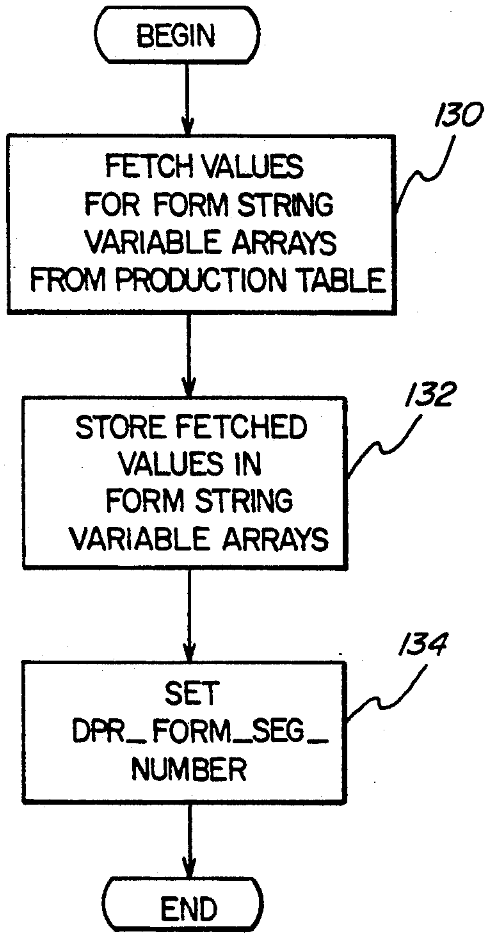
FIG. 14 depicts a flow chart of the steps performed by the "mdpr50" function.

The "mdpr50" function fetches values to form string variable arrays from the production table (step 130 in FIG. 14). It stores the fetched values in form string variable arrays (step 132). If there is more than one active form, only the values from the first form are used. The string variables that are fetched by this function include the job number, job name, form number and form name. This function also sets the dpr_form_seq_number (step 134). In the instance where the form data does not exist in the last form table, the function fills the four string variables with a string of question marks. These question marks serve as a flag to the user that the data was lost or is otherwise unavailable.

Figure 15:
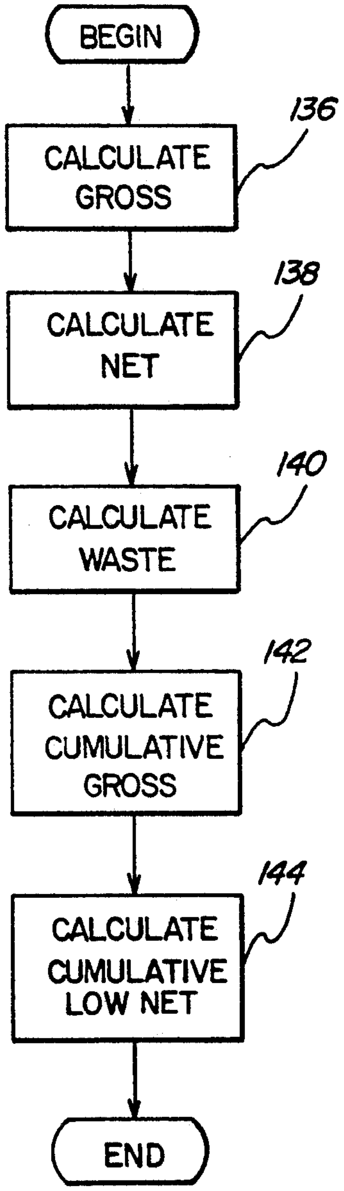
FIG. 15 depicts a flow chart of the steps performed by the "mdpr54" function.

A flow chart for the "mdpr54" function is shown in FIG. 15. This function calculates values for the fields of each daily press record row entry. Specifically, it calculates the gross, net and waste for each row (see steps 136, 138 and 140). These values are the actual counts generated during the block of time for each daily press record block. These values are equal to the difference between the cumulative value for the press for the start of the daily press record block and the end of the daily press record block. This function also calculates the cumulative gross (step 142), which is the value of the gross counter of the press at the point in time when the daily press record event ends. The gross value is obtained directly from the press log. Lastly, the "mdpr54" function calculates the cumulative low net (step 144), which is the lowest cumulative net value among all of the forms that were on press at the point in time in which the daily press record block ended. This value is used to indicate what quantity of product could be shipped at any particular point in time. It should be noted that the cumulative low net value is figured only for daily press record events that end with a "FORM STARTED" log entry or a "SHIFT CHANGE" log entry.

Figure 16:
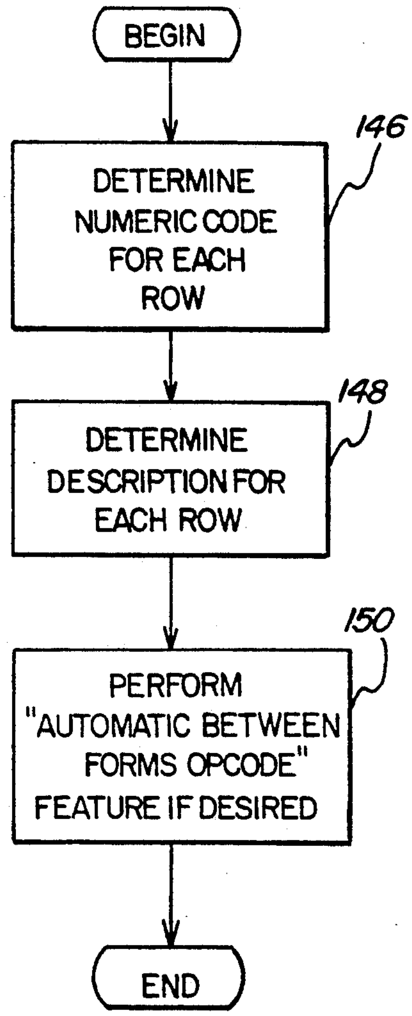
FIG. 16 depicts a flowchart of the steps performed by the "mdpr58" function.

The "mdpr58" function determines the numeric code for each row of daily press record table (step 146 in FIG. 16). For the "MAKEREADY I", "MAKEREADY II", and "RUNNING" entries, the numeric codes are fetched from global values that are established by the administrator of the system. However, for down time events, the numeric code for a daily press record block is the value of the opcode in the press log entry that was made by the operator. If the operator did not enter an opcode for a down-time event, the system assigns a value of "UNIDENTIFIED STOP". This value is typically set as a numeric code of "9999", but this value can be adjusted by the system administrator. This function also determines the description for each daily press record row (step 148). These descriptions are 20 character strings that correspond to the numeric codes. As mentioned above, there is a one-to-one correspondence between numeric codes and descriptions. Lastly, this function implements a "AUTOMATIC BETWEEN FORMS OPCODE" feature (step 150). This feature, under certain circumstances, automatically assigns a predefined opcode to daily press record events that occur between the end of one form and the start of the next form.

The software also includes various housekeeping routines that will not be described in detail herein. These routines perform functions such as eliminating daily press record events that have a time length of zero and combining daily press record events that are contiguous and identical. Other functions performed by these routines include global utility functions that can be called by the above-described daily press record functions and functions that print press log data, form production data and the daily press record table.

The present invention has the ability to associate employees with daily press record entries. To facilitate this capability, the system keeps a record of what crew is currently working on each press. The crew is recorded as a list of employees. The system provides two functions to the operator of the production monitor that affect the members of a recorded crew. In particular, the pressman operating the production monitor may invoke the "join crew" function to add himself to the crew currently recorded at the production monitor. Analogously, the operator may invoke a "leave crew" function which removes the employee from the recorded list of the crew.

Figure 17:
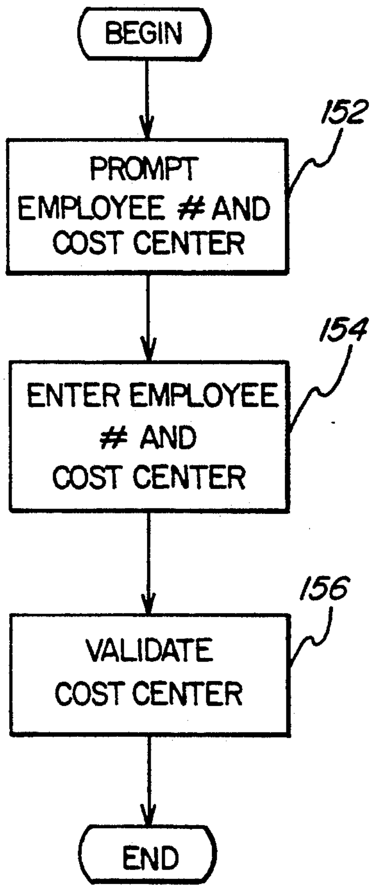
FIG. 17 depicts a flow chart of the steps performed by the join crew function.

The basic steps performed by the "join crew" function are illustrated as a flow chart in FIG. 17. Specifically, when an operator invokes the "join crew" function, the system responds by generating a prompt that requests an employee number and a cost center (step 152). The cost centers are used to designate billable rates for the operation of a press in different configurations. After the prompt by the system, the operator enters his employee number and the cost center (step 154). The system then checks to see that the cost center is a valid entry (step 156). This validation step includes a determination of whether the cost center has a machine number that matches the press number and a determination of whether the cost center number is different from the cost center which is currently configured by the system.

When the operator leaves a crew working on a particular press, he invokes the "leave crew" function. This function also performs steps 152 and 154 described above and causes the system to remove the employee from the list of employees in the crew.

A function related to the "join crew" function is the "lead crew" function. It performs all of the same steps shown in FIG. 17 for the "join crew" function but also flags the employee who is to be given credit for any gross, net and waste quantities that occur while the employee is on the press. Only the leader of the crew that is designated by this function gets credit for these quantities. The remaining employees only get credit for time worked.

Figure 18:
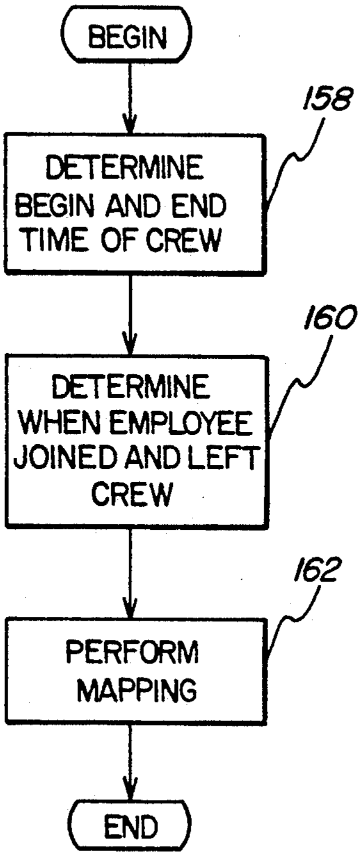
FIG. 18 depicts a flow chart of the steps performed by the "plogpost" program.

For the use of these functions, the system is able to create a database that holds crew information. A program designated as "plogpost" performs a mapping of the daily press record entries to each employee's begin and end times on a crew. The basic steps of this procedure are outlined in the flow chart of FIG. 18. Initially, the system determines the begin and end time of the current crew (step 158). Then, because employees may enter and leave the crew at different times during the beginning and ending point of the crew, the system determines when each employee joined and left the crew (step 160). Once this determination is made, the mapping can be performed in a straightforward fashion (step 162). As such, there is a correlation between the employee and the daily press records and such information may be called up in a report or other output.

While the present invention has been shown with reference to a preferred embodiment thereof, those skilled in the art will know of various changes in scope and form that may be made without departing from the spirit and scope of the invention as defined in the appended claims.

I claim:

1. A computerized monitoring system for monitoring web presses comprising:

means for automatically recording log entries for each web press, each log entry indicating an event and a time that the event occurred;

means for receiving and processing log entries;

memory means for storing a transition table having set of log entries and a set of corresponding response entries;

means for checking the transition table and for retrieving the corresponding response entry for the received log entries;

means for reporting the corresponding response entry and for causing the monitoring system to perform a task specified by the response entry;

means for generating a daily press record for at least one web press based on the log entries, said daily press record summarizing activity of a press for a time frame, including gross production and waste; and user interface means for displaying the daily press record to a user of the computerized monitoring system.

2. A computerized monitoring system as recited in claim 1 wherein said means for receiving and processing log entries generates the daily press record in real time as a number of different blocks, each block having information concerning an event, a time, and other information, wherein said daily press record is compiled by processing each log entry as a separate block in the daily press record when the response entry corresponding to the log entry indicates that a block should be formed.

3. A computerized monitoring system as recited in claim 1 wherein said means for receiving and processing log entries generates the daily press record so that it identifies workers that were operating the machine.

4. A computerized monitoring system as recited in claim 1 wherein said means for receiving and processing log entries generates the daily press record such that daily press record includes a listing of events and when the events occurred.

5. A computerized monitoring system as recited in claim 1 wherein said user interface means comprises video display.

6. A computerized monitoring system as recited in claim 1 wherein said user interface means comprises a press for generating a hard copy of the daily press record.

7. A computerized monitoring system as recited in claim 1 wherein said means for automatically recording log entries comprise production monitors coupled to respective web presses, each production monitor comprising means for monitoring activity of a web press and a memory for recording log entries.

8. A computerized monitoring system as recited in claim 1 wherein said means for receiving and processing log entries and said user interface means are part of a general purpose data processing system.

9. A data processing system for processing data regarding a web press comprising:

means for receiving a log report of said web press, the log report specifying events that occurred at said web press and when said events occurred;

means for receiving a shift report for said web press, the shift report including information regarding a current shift using the web press;

means for receiving a form report for said web press, the form report including information regarding a form being run on said web press;

means for processing said log report, said shift report and said form report to generate a daily press record that summarizes activity by the web press for a time frame;

means for selecting a reporting mode including:

a manual mode for generating one of the reports, an automatic mode for generating a daily press record at the end of a shift, and a real time mode for updating the daily press record when a new event occurs and is received; and user interface means for displaying said daily press record to a user of the data processing system in accordance with the selected mode.

10. A data processing system as recited in claim 9 wherein said means for processing generates the daily press record to include gross production and waste by said web press.

11. A data processing system as recited in claim 9 wherein said means for processing generates the daily press record such that the daily press record specifies a worker that was operating the web press.

12. A data processing system as recited in claim 9 wherein said means for processing generates the daily press record such that the daily press record specifies events that occurred at the web press and when said events occurred.

13. A data processing system as recited in claim 9 wherein said user interface means comprises a video display.

14. A data processing system as recited in claim 9 wherein said user interface means comprises a press for generating a hard copy of the video display.

15. A data processing system as recited in claim 9 further comprising means for a user to specify the time frame over which the daily press record summarizes activity of the web press.

16. The computerized monitoring system of claim 1 further comprising:

means for entering a down time code indicating a cause when a down time period occurs;

means for determining how many down time codes have been entered for a given down time period;

means for allocating the down time period among the entered down time codes in responds to a determination that there are a plurality of entered down time codes for a down time period.

17. The computerized monitoring system of claim 1 wherein one type of log entry is a shift change entry, the system further comprising:

means for determining whether the daily press record has more than two shift change entries;

means for indicating an error in response to a determination that there are not at least two shift change entried in the press report.

18. A computer implemented method for monitoring a web press comprising the steps of:

determining a mode of operation in response to a user input, the modes including an automatic mode for generating a report after a shift, and a real time mode;

receiving press log data monitored by one or more sensors and storing the press log data in arrays as press log entries;

examining each press log entry for an event code indicating an event on the web press;

consulting, for each press log entry, a look-up transition table to determine a responsive action corresponding to the press log entry;

performing the responsive action indicated by the transition table;

determining whether, and how many, down time codes have been entered by a user if a down time event occurs;

determining, with allocation rules, how much time of the down time event should be allocated to each down time code;

determining, if in automatic mode, whether two shift change entries have been received as press log entries;

determine gross count, waste count, and net count of the output of the web press; and receiving and storing information relating to crew members working with the web press.

* * * * *